US006567807B1

(12) United States Patent
Robles et al.

(10) Patent No.: US 6,567,807 B1
(45) Date of Patent: May 20, 2003

(54) INVESTOR RELATIONS EVENT SCHEDULING SYSTEM AND METHOD

(75) Inventors: Jose L. Robles, Boston, MA (US); Kishore D. Rao, Boston, MA (US); Robert I. Adler, Belmont, MA (US)

(73) Assignee: CCBN.com, Inc., Boston, MA (US)

( * ) Notice: Subject to any disclaimer, the term of this patent is extended or adjusted under 35 U.S.C. 154(b) by 0 days.

(21) Appl. No.: 09/493,075

(22) Filed: Jan. 28, 2000

(65) Prior Publication Data
(65)

(51) Int. Cl.$^7$ .............................................. G06F 17/30
(52) U.S. Cl. .......................... 707/10; 707/104.1; 705/8
(58) Field of Search ............................. 705/8, 9; 707/1, 707/10, 100, 104.1

(56) References Cited

U.S. PATENT DOCUMENTS

| | | | | |
|---|---|---|---|---|
| 5,819,271 A | * | 10/1998 | Mahoney et al. | 707/104.1 |
| 5,867,822 A | * | 2/1999 | Sankar | 705/8 |
| 5,877,759 A | * | 3/1999 | Bauer | 707/10 |
| 6,396,512 B1 | * | 5/2002 | Nickerson | 707/10 |

OTHER PUBLICATIONS

Parkinson, "Powercore unveils group scheduler." Jan. 18, 1993, MacWEEK, vol. 7, No. 3, p. 13(1).*

Ayre, "Mail–enabled applications help groups work together." Oct. 27, 1992, PC Magazine, vol. 11 No. 18, p. 268(2).*

Coulter, G. and Marquis, A., "Mastering Microsoft® Outlook™ 98," pp. 253–312, 459–484, Jun. 1998.

* cited by examiner

Primary Examiner—Jack Choules
(74) Attorney, Agent, or Firm—Synnestvedt & Lechner LLP

(57) ABSTRACT

The disclosed invention uses an event manager, an events database, and a personal computing device to provide investor relations event scheduling. The event manager includes a web server, a scripting engine, and scripts for receiving event information. The personal computing device and event manager are preferably implemented in a client-server architecture on an electronic network such as the Internet. The personal computing device includes a web browser and electronic mail for user interaction. The database stores events and maintains a watchlist of organizations for each user. The event manager detects schedule conflicts between a proposed new scheduled event and each existing event for each organization listed on the watchlist and transmitting a conflicts notification. Override of schedule conflicts is permitted to allow scheduling of an event when conflicts are acceptable. An event report is transmitted to each user associated with the organization with which the new scheduled event is associated.

27 Claims, 16 Drawing Sheets

FIG.3

*StreetEvents*
A Service of CCBN.com

Help ▷
Feedback ▷

Search all 22521 events by ticker: [ ] ▷

| What's New | All Events | WatchList Events | WatchList Reports | My Calendar | Adv Search | My Profile | Logout |

User Name                                                                                   Jan 5, 2000. 4:06pm ET ( WatchList | E-mail Notification | Contact Info )

Add Companies                                                          My Companies

Enter the tickers for the companies to
be added to the WatchList.

[                ]        ADD ▷         F - Ford Motor Company
                          ◁ REMOVE      LU - Lucent Technologies
                          ( Remove All )  OMPT - Omnipoint

Select Topics                                                           My Topics

Adding topics will result in notification
of IPOs, investment conferences, and
trade shows.
It will not add companies to your           ADD ▷          Telecommunications
WatchList.                                      ◁ REMOVE
                                                ( Remove All )
Aerospace/Defense
Automotive
Banking
Chemicals

Select Event Types                                                      My Event Types

All
Quarterly Earnings Release         ADD ▷          Quarterly Earnings Release
Conference Call                    ◁ REMOVE       Conference Call
Conference                         ( Remove All ) Conference
Conference Presentation                           Conference Presentation
Other                                             Other

FIG.5

StreetEvents
A Service of CCBN.com

Help ▷
Feedback ▷
Search all 22521 events by ticker: [ ] ▷

| What's New | All Events | WatchList Events | WatchList Reports | My Calendar | Adv Search | My Profile | Logout |

User Name                                                    Jan 5, 2000. 4:07pm ET

| WatchList | E-mail Notification | Contact Info |

Reset | Submit

| Field | Value |
|---|---|
| User name | AAAAA |
| Password | [ ] |
| Retype Password | [ ] |
| Email | username @ domain.com |
| Salutation | Mr. ▼ |
| First Name | [ ] |
| Last Name | [ ] |
| Role | Analyst ▼ |
| Title | [ ] |
| Address | [ ] [ ] |
| State | [ ▼ ] |
| City Name | [ ] |
| Zip Code | [ ] |
| Country | United States ▼ |
| Time Zone | ET ▼ |
| Tel. Number | [ ] |
| Fax Number | [ ] |
| Company | [ ] |
| Firm Type | Consultant ▼ |

IMPORTANT: You must click on the "Submit" button to save all changes to your Contact Info.

Reset | Submit

User Name

From: Street Events [StreetEvents@streetevents.com]
Sent: Wednesday, January 05, 2000 10:24 PM
To: user @ domain.com
Subject: Street Events WatchList Update - Thurday, January 06, 2000

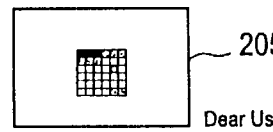

205

Dear User,

StreetEvents now provides First Call estimates!

Consensus estimates are displayed below the earnings release and conference call details of over 5,000 companies on StreetEvents.

To access true "one-stop shopping" for corporate earnings information, go to http://www.streetevents.com.

The new or modified events for companies in your profile are listed below:

---

Deutsche Banc Alex. Brown Media & Telecommunications Conference
Jun 5, 2000 to Jun 7, 2000
Description: By Invitation Only. Please contact your Deutsche Banc Alex. Brown representative for further information
Address: The Pierre
New York, NY
Contact Info: Deutsche Banc Alex. Brown
Last Updated: 1/5/00 9:22:15 AM ET

---

To change your profile or to unsubscribe to these e-mails, go to:
http://www.streetevents.com This StreetEvents WatchList Update includes events in the vCalendar format. vCalendar events can be downloaded directly to Microsoft Outlook or any other vCalendar-compatible application.

To download a StreetEvent, simply double-click on
the chosen event icon located at the bottom of this e-mail.
A window will pop up that allows you to view the event details.
Then click the "Save and Close" button in the upper left-hand corner.

If you have any questions, please contact your account executive or call:

Client Service Dept.
617.850-7969 x 7721

This message contains confidential information and is intended
only for the use of the individual to whom it is addressed.
Any copying, distribution or disclosure is strictly prohibited.
If you have received this communication in error, please notify
us immediately by e-mail: streetevents@streetevents.com

FIG.7

User Name
_____

Subject: StreetEvents: Deutsche Banc Alex. Brown Media & Telecommunications Conference
Location: No Time Specified Start: Mon 6/5/00 5:00 AM
End: Wed 6/7/00 5:00 AM Recurrence: (none)

Description: By Invitation Only. Please contact your Deutsche Banc Alex. Brown representative for further information
Address: The Pierre
New York, NY Contact Info: Deutsche Banc Alex. Brown _____ seID#26732

StreetEvents
*A Service of CCBN.com*

What's Happening on Wall Street

| Home | About Street Events | Corporate | Contacts | Employment |

*StreetEvents*, a service of CCBN.com, is an interactive master calendar of Wall Street events featuring earnings release, conference call, company presentation and brokerage conference information.

Investment and IR professionals request a password here: [GO]

4431 *StreetEvents*
Registered subscribers login:

Username: [          ]

Password: [          ] [GO]

Forgot your password? Click here.

*StreetEvents* Search

Company Ticker Lookup

Ticker: [          ] [GO]

*StreetEvents* Site Info

January 4, 2000
Online Investor Magazine gives StreetEvents an 8 out of 10 in its roundup of online resources. More...

December 21, 1999
"Investment Skinny" More...

December 20, 1999
"Online Conference Highlights" More...

December 3, 1999
Redchip.com Presents a WebCast Conference of Tomorrow's Tech Leaders Today More...

December 1999
Red Herring magazine profiles CCBN.com and StreetEvents in its December issue More...

November 9, 1999
CCBN.com Signs 1,000th Client for Web IR Service More...

November 1999
"A New Web Monster For Company Data? Vendor Goads Silicon Valley Rival"-Traders Magazine More...

October 29, 1999
The Red Chip Review Presents a WebCast Conference on Eight Emerging Tech Companies More...

October 18, 1999
CCBN.com launches StreetEvents, a Web-based portal for Investment related event Information More...

Individual Investor Center

Upcoming Earnings Releases

| Company Name | Ticker | Date | Time (ET) |
|---|---|---|---|
| Intimate Brands | IBI | 1-5 | 7:00am |
| Nautica Enterprises | NAUT | 1-5 | BMO |
| Nu Horizons Electronic | NUHC | 1-5 | BMO |
| Leap Wireless International | LWIN | 1-5 | AMC |

To listen to the multimedia event, click on the 🔊 [Full Page]

Online Conference Call Replays 🔊

| Company Name | Ticker | Date | Time (ET) | |
|---|---|---|---|---|
| A B Watley Group | ABWG | 11-9 | 5:00pm | 🔊 | 210
| AFLAC | AFL | 10-27 | 9:00am | 🔊 |
| Allied Capital | ALLC | 10-26 | 10:15am | 🔊 |
| Alysis Technologies | ALYS | 10-26 | 5:30pm | 🔊 |
| AMLI Residential Properties Trust | AML | 11-3 | 2:30pm | 🔊 |
| American Tower | AMT | 11-4 | 11:00am | 🔊 |

To listen to the multimedia event, click on the 🔊 [Full Page]

Legend

To listen to the multimedia event, click on the icon:
- 🔊 Live conference call webcast
- 🔊 Online conference call replay

Date and time abbreviations:
- \* Estimated date (the event will take place in the days following the indicated date)
- AMC After Market Closes
- BMO Before Market Opens

FIG.10A

StreetEvents
A Service of CCBN.com

Help ▷
Feedback ▷

Search all 22521 events by ticker: [ ] ▷ ⟋215

| What's New | All Events | WatchList Events | WatchList Reports | My Calendar | Adv Search | My Profile | Logout |

User Name                                                              Jan 5, 2000. 4:08pm ET

| Upcoming WatchList Events | New WatchList Events | 🔊 Upcoming WatchList Audio |

Sort By: [Date Time ▼]

◉ Salomon Smith Barney 10th Annual Entertainment, Media & Telecom Conference
Jan 9, 2000 to Jan 13, 2000 *Palm Springs, CA*

◉ Morgan Stanley Dean Witter Broadband 2000: CTOs Unplugged Conference
Jan 18, 2000 *New York, NY*

◉ LU - Lucent Technologies Earnings Release
Estimated date range: Jan 18, 2000 - Jan 21, 2000

◉ C.E. Unterberg, Towbin Satellite Conference
Jan 25, 2000 *New York, NY*

◉ C.E. Unterberg, Towbin Broadband Conference
Jan 26, 2000 *New York, NY*

◉ F - Ford Motor Company Earnings Release
Jan 26, 2000

◉ OMPT - Omnipoint Earnings Release
Estimated date range: Feb 14, 2000 - Feb 19, 2000

◉ ING Barings Satellite Industry Conference
Mar 1, 2000 to Mar 2, 2000 *New York, NY*

◉ Credit Suisse First Boston Global Telecom CEO Conference
Mar 3, 2000 to Mar 10, 2000 *New York, NY*

◉ Morgan Stanley Dean Witter Global Telecom Conference
Mar 29, 2000 to Mar 31, 2000 *New York, NY*

◉ Banc of America Securities Growth Telecom, Media & Entertainment Conference
May 15, 2000 to May 17, 2000 *New York, NY*

◉ Deutsche Banc Alex. Brown Media & Telecommunications Conference
Jun 5, 2000 to Jun 7, 2000 *New York, NY*

◉ CIBC World Markets Communications Food Chain Conference
Jun 12, 2000 to Jun 14, 2000 *New York, NY*

◉ ING Barings Media & Communications Conference
Sep 20, 2000 to Sep 22, 2000 *New York, NY*

1-14 of 14 Events

FIG.10B

User Name     Jan 5, 2000. 4:08pm ET

F - Ford Motor Company

Last updated: Dec 16, 1999, 9:11am ET

Next Earnings Release:
  ○ F - <u>Ford Motor Company Earnings Release</u>
    Jan 26, 2000

Next Conference Call:
  No upcoming conference calls are recorded.

Other Upcoming Events:
  No other upcoming events are recorded.

<u>< Back to WatchList Reports</u>

Contact Information:

Chief Financial Officer
The American Road
Room 1163
Dearborn, MI 48121-1899
USA
Tel: 1-800-279-1237
Fax: 313 845-6073

FIG.10C

StreetEvents
A Service of CCBN.com

Help
Feedback

Search all 22521 events by ticker:

| What's New | All Events | WatchList Events | WatchList Reports | My Calendar | Adv Search | My Profile | Logout |

User Name                                                    Jan 5, 2000. 4:09pm ET ◁ January, 2000 ▷        Day | Week | ◁Month▷          Time Zone: ET ▼

January, 2000                                            List View

| January | February |
| March | April |
| May | June |
| July | August |
| September | October |
| November | December |

(Today)

Go to a specific date by entering in the date

[      ] (Go)
(mm/dd/yy)

| Sunday | Monday | Tuesday | Wednesday | Thursday | Friday | Saturday |
|--------|--------|---------|-----------|----------|--------|----------|
|        |        |         |           |          |        | 1        |
| 2 ✗ Conf | 3 | 4 | 5 | 6 | 7 | 8 |
| 9 | 10 ✗ Conf ✗ LU | 11 | 12 | 13 | 14 | 15 |
| 16 | 17 | 18 ✗ Conf | 19 ✗ Conf ✗ F | 20 | 21 | 22 |
| 23 | 24 | 25 | 26 | 27 | 28 | 29 |
| 30 | 31 |   |   |   |   |   |
| Sunday | Monday | Tuesday | Wednesday | Thursday | Friday | Saturday |

BMO: Before Market Opens
AMC: After Market Closes
NTS: No Time Specified
✗: Remove from Calendar The Calendar can be viewed by month, week or day. You can also change the time zone in which you view all of your events.

FIG.10D

StreetEvents
A Service of CCBN.com

Help ▷
Feedback ▷

Search all 22522 events by ticker: [____] ▷

| What's New | All Events | WatchList Events | WatchList Reports | My Calendar | Adv Search | My Profile | Logout |

User Name                                             Jan 5, 2000. 4:10pm ET

[ Find Event ]

Search My WatchList

Event Type:      [---------- All ----------  ▼]

Event Date:      From: [1/5/00] mm/dd/yy
                 To:   [_____] mm/dd/yy                ( Clear Form )( Search )

Search By Company

Company:         ⦿ Ticker: [_____]
                 ○ Name:   [_____]

Event Name:      [_____]

Event Type:      [---------- All ----------  ▼]

Event Date:      From: [1/5/00] mm/dd/yy
                 To:   [_____] mm/dd/yy                ( Clear Form )( Search )

Search For Conferences

Sponsor Name:    [_____]

Event Name:      [_____]

Topic:           [--- Not Specified ---  ▼]

Event Date:      From: [1/5/00] mm/dd/yy
                 To:   [_____] mm/dd/yy                ( Clear Form )( Search )

INVESTOR RELATIONS EVENT SCHEDULING SYSTEM AND METHOD

A portion of this disclosure contains material which is subject to copyright protection. The copyright owner has no objection to the facsimile reproduction by anyone of the patent document or patent disclosure, as it appears in the Patent and Trademark Office file or records, but otherwise reserves all copyright rights whatsoever.

BACKGROUND OF THE INVENTION

1. Field of the Invention

The present invention relates generally to event scheduling using electronic networks, and, more specifically, to providing automated scheduling and notification of investor relations events using electronic networks.

2. Background

Organizations that rely on financing through publicly traded securities benefit from timely and accurate dissemination to members of the investment community who follow its stocks and securities of new information potentially affecting their financial position, and, consequently, the market valuation for their securities. Publicly-held corporations, for example, are required to periodically report certain information regarding financial condition in compliance with financial disclosure and reporting requirements imposed by federal law, including applicable securities regulations. Securities analysts must factor into consideration the latest financial information from a corporation in order to produce a market price prediction over time for the corporation's stock or security. This market price prediction is useful and valuable to the analysts' clients. The economic value of an analysts' security valuation prediction increases as the accuracy of the prediction increases. Further, the overall process of adjusting and reflecting the effect of material information in the price of a given security is also key to the efficient functioning of the capital markets in which the organization's securities are traded.

However, this dissemination activity imposes a burden on the reporting organization's resources. In the corporate context, for example, this burden may be borne by investor relations personnel, the chief financial officer, or other person, employee, or group. It would therefore be advantageous to provide a system and method that automatically manages the dissemination of investor information, thereby reducing the resource burden on the reporting organization.

Moreover, obtaining and verifying financial and related information from reporting organizations imposes a burden on the analyst. The analyst's burden is compounded by the fact that any one particular analyst usually follows and monitors information released by several such reporting organizations. For example, one analyst may have to track and monitor the financial disclosures from each significant competitor in a given industry group, product category, or market segment in order to gauge the affects of competition on the market price of a followed security. Ideally, the analyst will attend meetings held by the reporting organization to directly obtain clarifying or explanatory information in the form of answers to questions posed to officers representing the organization. However, since quarterly financial reporting period end dates for many organizations coincide, this goal is often difficult to achieve due to conflicting meeting schedules.

In general, the more analysts that follow an organization's securities, the more the organization benefits in terms of the market price for its securities. Coverage by more analysts increases market awareness of the organization's securities and thereby increases demand for them. It is thus in the best interests of the organization to actively manage the scheduling of investor relations events in order to avoid the occurrence of conflicting events that could dilute analysts' interest.

SUMMARY OF THE INVENTION

Therefore, it is an object of the present invention to provide a system and method that determines and reports a set of scheduled investor relations events that are proximate in time to a proposed scheduled investor relations event, thereby making available to the person or organization proposing the new event information that is helpful to avoiding conflicts in the scheduling of new events.

It is a further object of the present invention to provide a system and method that supports reliable and timely dissemination of investor relations information and events.

These as well as other objects of the present invention will be apparent to those of skill in the art upon inspection of this specification and the drawings herein.

BRIEF DESCRIPTION OF THE DRAWINGS

FIG. 3 is a preferred embodiment of an interactive web page for entering a watchlist;

FIG. 5 is a preferred embodiment of an interactive web page for entering a personalization data;

FIG. 6 is an example of a preferred embodiment of an email event notification message;

FIG. 7 is an example of a preferred embodiment of a vCalendar file attachment;

FIG. 9 is an example of a home web page provided by a preferred embodiment of the present invention;

FIG. 10a is an example of a preferred embodiment of a report providing a list of upcoming watchlist events;

FIG. 10b is an example of a preferred embodiment of an organization report provided for each organization contained in a watchlist;

FIG. 10c is an example of a preferred embodiment of a personal calendar showing dates of events for each organization contained in a watchlist;

FIG. 10d is an example of a preferred embodiment of an advanced event searching capability;

DETAILED DESCRIPTION OF THE PREFERRED EMBODIMENTS

The present invention comprises a system and method for the automated management and dissemination of investor relations event scheduling information.

Figure 1:
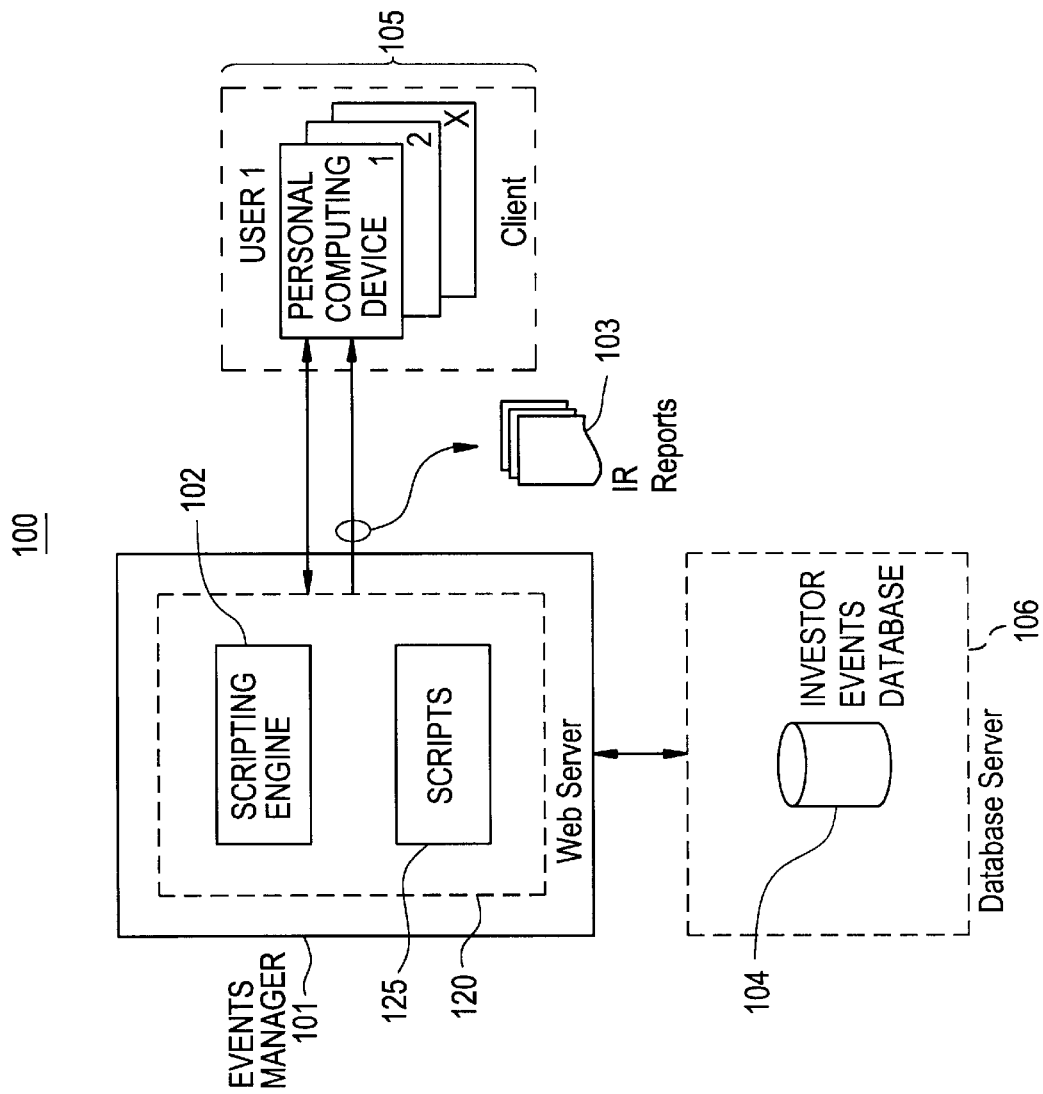
FIG. 1 is a functional block diagram of a preferred embodiment of a system according to the present invention.

In a preferred embodiment, an event scheduling system 100 comprises an events manager 101, IR reports 103, a database server 106, and a personal computing device 105 as shown in FIG. 1. Event scheduling system 100 is preferably implemented in accordance with the client-server architecture as shown in FIG. 1 for transmitting and receiving electronic messages and serving worldwide web pages over an electronic network such as the Internet. Client users interact with event scheduling system 100 using web browser enabled personal computing device 105.

Personal computing device 105 is preferably a personal computer (PC) running a web browser application such as, but not limited to, Microsoft® Internet Explorer™, and an electronic mail application such as, but not limited to, Microsoft® Outlook™. However, personal computing device 105 may be any web browser or electronic mail enabled electronic appliance, such as, but not limited to, a personal organizer. In a preferred embodiment, personal computing device 105 and events manager 101 communicate by transmitting and receiving electronic messages over an electronic network, such as the Internet, in accordance with the Hypertext Transport Protocol (HTTP) and Simple Mail Transport Protocol (SMTP).

Referring again to FIG. 1, events manager 101 includes a web server 120, a scripting engine 102, and scripts 125. Events manager includes business logic required to effect the operation of event scheduling system 100 as described herein.

Web server 120 receives electronic messages from personal computing devices 105 and transmits to the personal computing devices 105 of interested users electronic messages and web pages or frames containing information pertaining to the scheduling of investor relations events. In a presently preferred embodiment, web server 120 is implemented using the Internet Information Server (IIS) web server application provided by Microsoft® Corporation. Detailed information concerning use of IIS for web applications may be found in industry publications such as the development guidelines provided online at "http://www.microsoft.com/NTServer/web/deployment/planguide/WebAppDev.asp" published by Microsoft® Corporation.

Scripts 125 include: (1) Scripts 125 to extract information from HyperText Markup Language (HTML) forms received via events manager 101 from users via personal computing devices 105, and (2) Scripts 125 to generate web pages comprising IR reports 103 containing content retrieved from investor events database 104 to be transmitted by events manager 101 to users via personal computing devices 105.

In a preferred embodiment, scripting engine 102 is implemented as an Active Server Pages (ASP) scripting environment. In alternative embodiments, scripting engine 102 is implemented using another language such as, but not limited to, Java, C++, JavaScript™, PERL, or Virtual Basic® Script (VBScript). Scripting engine 102 and scripts 125 provide means for events manager 101 to access information contained in investor events database 104; other embodiments providing such database access means are possible and are to be included within the scope of the present invention.

Events manager 101 and scripting engine 102 are preferably implemented in accordance with the Microsoft® Windows NT™ Server environment for a personal computer workstation.

In a preferred embodiment, database server 106 comprises an investor events database 104 which is a relational database management system that stores and retrieves information as directed by scripting engine 102. Scripting engine 102 executes the programmed instructions contained in one or more scripts 125. In a preferred embodiment, scripts 125 are maintained in non-volatile storage at web server 120. Alternatively, scripts 125 are maintained in non-volatile storage at database server 106. Generally, scripts 125 may be maintained using any local or remote non-volatile storage means accessible to events manager 101. Scripts 125 executed by scripting engine 102 thereby control the storage and retrieval of information contained in investor events database 104.

Figure 2:
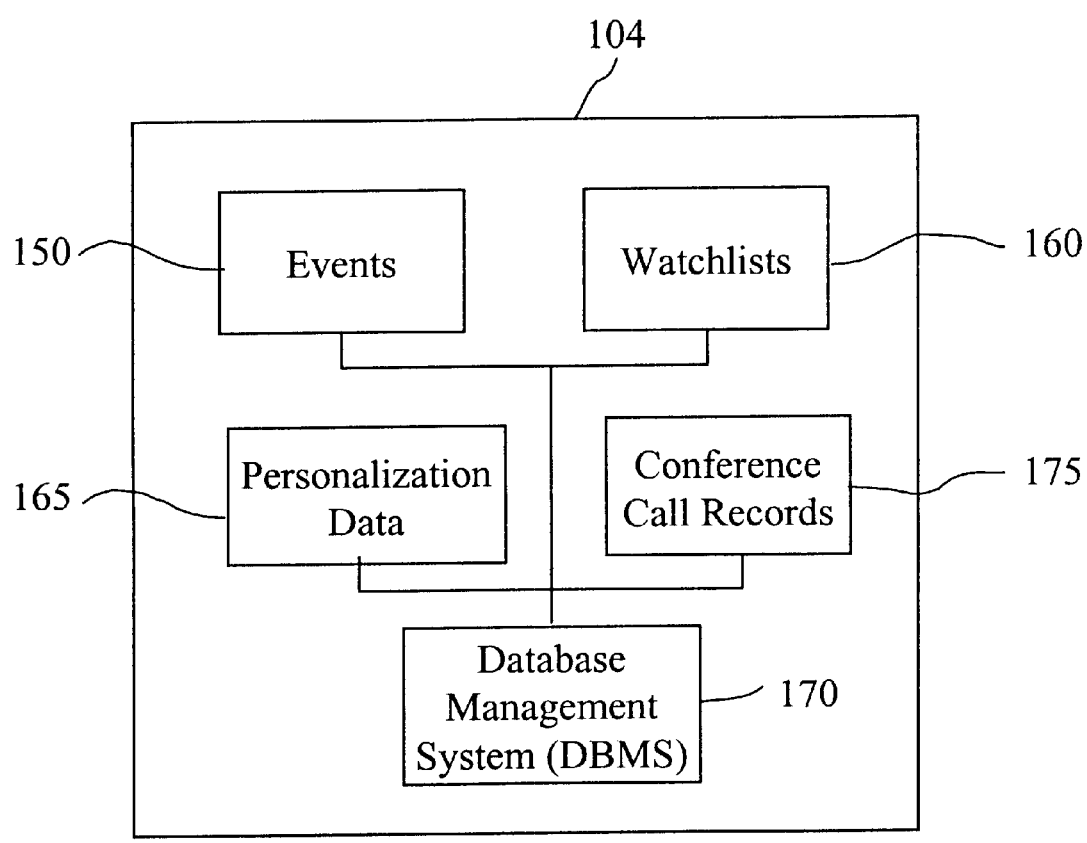
FIG. 2 is a description of information contained in an investor events database according to the present invention.

In a preferred embodiment, illustrated in FIG. 2, investor events database 104 includes events 150, watchlists 160, personalization data 165, database management system 170, and archived audio conference call records 175. Information contained in investor events database 104 may be indexed, sorted, or accessed by a variety of attributes including, but not limited to, the name of the organization with which the information record is associated. Alternatively, a unique identifier may be used to distinctly identify each organization for this purpose (e.g., stock ticker, or other numeric, alphabetic, or alphanumeric identifier). In a preferred embodiment, database management system (DBMS) 170 is an SQL server application such as, but not limited to, Microsoft® SQL Servers™ 7.0 running on a personal computer workstation.

An event 150 is a database record comprising fields of information describing various aspects of an investor relations event for a particular organization. Event 150 information fields include, but are not limited to, the description, date, time, and location of the event.

Events 150 contained in investor events database 104 are preferably stored and maintained in conformance with the Structured Query Language (SQL) database standard. In addition to storing and retrieving events 150, scripting engine 102 also converts retrieved events 150 to comply with the vCalendar file format (i.e., ".vcs" files). Scripting engine 102 accomplishes this conversion by invoking the appropriate SQL procedure calls to database management system 170 of investor events database 104 in accordance with the instructions contained in an executing script 125.

A watchlist 160 is a database record comprising fields of information identifying one or more organizations for which investor relations events are of interest to a particular user. Watchlists 160 are useful for identifying one or more particular organizations for which event scheduling system 100 manages and advises the user of the existence of scheduled investor relations events 150. Watchlist 160 also provides the basis for event scheduling conflicts processing as further described herein. Watchlists 160 are also useful for monitoring the scheduling of investor relations events 150 associated with competitors, industry or market segment leaders, or other organizations of interest, as well as for identifying conflicts between a proposed to-be-scheduled event 150 for a watchlist 160 organization and the previously scheduled events 150 for competitors, industry or market segment leaders, or other organizations of interest also contained in watchlist 160. A user of event scheduling system 100 establishes a watchlist 160 by selecting one or more organizations using an interactive web page and the web browser of personal computing device 105. A preferred embodiment of an interactive web page useful for entering a watchlist 160 is shown in FIG. 3.

In an alternative embodiment, events manager 101 determines additional entries for watchlist 160 by selecting a set of organizations based on degree of fit to a particular set of criteria based on a particular organization already contained in a user's watchlist 160. These criteria may include, but are not limited to, industry segment, market segment, market position, product attributes, or service attributes.

Figure 4:
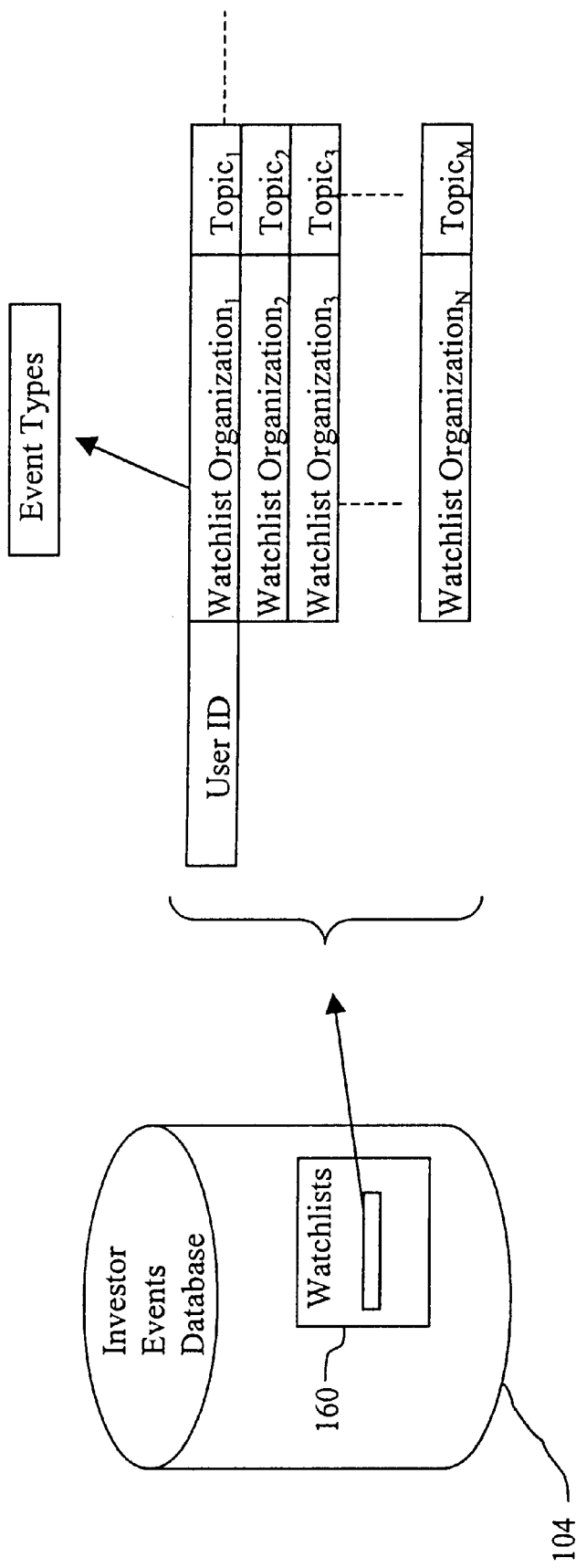
FIG. 4 is a description of the information associated with a watchlist contained in a preferred embodiment of an investor events database.

Further description of the arrangement of watchlist 160 information contained in investor events database 104 is described in FIG. 4.

Personalization data 165 includes user-specific information useful for events manager 101 to provide personalized interactive web pages to a particular user. Personalization data 165 for a particular user includes, but is not limited to, a user identifier (which may be the user's name or other unique identifier), an access password assigned to the user by events manager 101, and contact information. A preferred embodiment of an interactive web page useful for entering personalization data 165 is shown in FIG. 5.

In a preferred embodiment, IR reports 103 are provided in the form of interactive web pages generated by events manager 101 and transmitted to personal computing devices 105 by events manager 101. To generate an IR report 103, events manager 101 accesses events 150, watchlists 160, and personalization data 165 by transmitting requests to and receiving data from scripting engine 102. In a preferred embodiment, events manager 101 requests are provided in the form of object oriented commands and messages in accordance with, for example, the ActiveX Data Objects (ADO) model, directed to accessing objects contained in investor events database 104. ADO is an object-oriented information access model that supports access to objects contained in a relational database independent of a particular computing platform. Alternatively, events manager 101 accesses records and information contained in investor events database 104 using Javasoft™ Java Database Connectivity (JDBC™) commands and messages.

Further, in a most preferred embodiment, when a new event 150 is entered into investor events database 104 for an organization listed on one or more watchlists 160, events manager 101 automatically transmits an SMTP-formatted email event notification message 200 to the personal computing device 105 of each user associated with a watchlist 160 containing the reporting organization. An example of a preferred embodiment of an email event notification message 200 is shown in FIG. 6. Email event notification message 200 is transmitted to the user's email address as specified in personalization data 165 and is displayed to the user by the email application of personal computing device 105.

Figure 8:
FIG. 8 is a preferred embodiment of an interactive web page useful for allowing a user to indicate whether or not to automatically receive a vCalendar file attachment and an email event notification message.

Email event notification message 200 preferably contains a vCalendar file attachment 205 (i.e., ".vcs" file) to allow the recipient user to import the new event 150 schedule information into a personal online calendar using personal computing device 105. The vCalendar standard specifies a file format facilitating importation of information into scheduling applications such as, but not limited to, Microsoft Outlook™. The vCalendar specification provides a formatting definition useful for exchanging calendaring and scheduling information between scheduling application programs, such as those commonly used with personal computers and organizers. An example of a preferred embodiment of a vCalendar file attachment 205 is shown in FIG. 7 (for the example email event notification message 200 of FIG. 6). A preferred embodiment of an interactive web page useful for allowing a user to choose whether or not to automatically receive vCalendar file attachment 205 and email event notification message 200 is shown in FIG. 8. In a most preferred embodiment, event scheduling system 100 provides the capability for the user to choose to receive additional types of email notification messages including, but not limited to, daily or weekly event reminders.

IR reports 103 are useful for presenting event 150 scheduling information to a user. To receive an IR report 103 using scheduling system 100, in a preferred embodiment, a user enters the Uniform Resource Locator (URL) associated with the Internet address of web server 120 (e.g., "www.streetevents.com") into the web browser of the user's personal computing device 105. Personal computing device 105 then transmits an HTTP-formatted message to events manager 101 requesting the web page designated in the URL. Events manager 101 then establishes an Internet session with personal computing device 105 (i.e., session-layer connectivity is established between events manager 101 and personal computing device 105, independent of the underlying transport, data link, and physical layer protocols). Upon receipt of this web page request message, events manager 101 requests scripting engine 102 to execute the appropriate ASP script to generate the requested interactive web page from the information contained in investor events database 104 as described elsewhere herein. The web page thus generated is then transmitted by events manager 101 to the requesting personal computing device 105 in accordance with the HTTP messaging protocol. Personal computing device 105 then displays the interactive web page containing the associated IR report 103 via web browser.

Event scheduling system 100 also provides the capability for a user to access and listen to live audio conferences or archived conference call records. To provide access to archived conference call records 175, events scheduling system 100 provides an interactive HTML audio link 210 (reference FIG. 9) that causes events manager 101 to transmit a streaming audio feed to the personal computing device 105 associated with the requesting user. Upon receiving an electronic message from personal computing device 105 indicating operator selection of an interactive HTML link associated with a request to receive a streaming archived conference call record 175, events manager 101 requests scripting engine 102 to execute one or more scripts 125 to retrieve the archived conference call record 175 from investor events database 104. Upon receipt of the archived conference call record 175 from investor events database 104, events manager 101 then transmits the call record 175 information to personal computing device 105 as a streaming audio file. Personal computing device 105 then uses a web browser based audio player, such as, but not limited to, RealPlayer™ provided by Real Networks, Inc., in order to allow the user to listen to the archived conference call record 175.

To provide access to live conference calls, events scheduling system 100 provides an interactive HTML audio link 210 that routes the user to the web server that is providing a live audio streaming feed using an electronic network such as the Internet. Different visual icons are used to allow the user to distinguish between live conference call links 210 and archived record links 210, as described in FIG. 9.

FIG. 9 provides an example of an initially-provided interactive web page (i.e., a home page) provided by a preferred embodiment of the present invention in response to receiving an HTTP message specifying the URL for events manager 101. Referring now to FIG. 9, the home page provides an interactive entry field for registered users (i.e., subscribers) to log onto event scheduling system 100. Registered users log onto event scheduling system 100 by entering a previously assigned username and password pair.

Unregistered users may obtain a username and password from events manager 101 by registering with event scheduling system 100 using the interactive web page as shown in FIG. 5. Upon registration, events manager 101 causes the registration information obtained from the user submitted via interactive web page to be stored in personalization data 165.

If a user enters a user name and password in the appropriate interactive fields of the home page (reference FIG. 9) and transmits the home page to events manager 101 via HTTP message from personal computing device 105, events manager 101 compares the corresponding user name and password information contained in personalization data 165. If the entered information matches the corresponding information contained in personalization data 165, the registered user is provided access to detailed IR reports 103 for organizations listed on watchlist 160. Initially, the registered subscriber user is provided with an IR report 103 listing all scheduled events for all organizations listed on watchlist 160. An example of a preferred embodiment of an initial detailed IR report 103 providing a list of upcoming watchlist events is shown in FIG. 10*a*.

Users can access organization event information by entering the stock market ticker symbol in the indicated field of the user interactive client home page associated with event scheduling system 100. An example of a preferred embodiment of a web page containing a user interface display of event scheduling system 100 is shown in FIG. 9. Entering a particular ticker symbol causes event scheduling system 100 to report all investor-related information contained in investor events database 104 for the selected organization. In a most preferred embodiment, event scheduling system 100 provides the capability for a user to search investor events database 104 by organization (e.g., company name or ticker symbol), by event, or by date/time.

Referring now to FIG. 10*a*, in a preferred embodiment of event scheduling system 100, IR reports 103 provide an interactive tab bar 215 that allows a registered user to select from among a variety of IR reports 103 using the individual tabs of tab bar 215. User-selectable IR reports 103 include, but are not limited to, separate interactive ASP web page reports providing:

(1) The most recently scheduled events 150 (e.g., "What's New" tab);

(2) All scheduled events 150 stored in investor events database 104 (e.g., "All Events" tab);

(3) Events 150 associated with each organization contained in watchlist 160 (e.g., "Watchlist Events" tab);

(4) Organization reports for each organization contained in watchlist 160 (e.g., "Watchlist Reports" tab), an example of which is shown in FIG. 10*b*;

(5) A personal calendar showing dates of events 150 for each organization contained in watchlist 160 (e.g., "My Calendar" tab), an example of which is shown in FIG. 10*c*;

(6) An advanced event 150 searching capability for locating one or more specific events 150 or for excluding one or more specific events 150 from the search (e.g., "Adv Search" tab), an example of which is shown in FIG. 10*d*; and (7) Display of Personalization data 165 for the registered subscriber (e.g., "My Profile" tab), an example of which is shown in FIG. 5.

In addition, events 150 listed in IR reports 103 may be searched and displayed according to a variety of criteria such as, but not limited to, event date/time, event location (e.g., city, state, country), organization, or type of event (e.g., archived conference call, live conference call).

Preferably, investor events database 104 does not require or receive HTML-formatted input data or data received via HTTP interface at the time of generation of any one of IR reports 103. Further, no dynamic data from reporting organizations or their web sites is used directly by events manager 101 at the time of generation of any one of IR reports 103. That is, all investor information needed to produce any one of IR reports 103 is contained entirely in investor events database 104. No run-time HTML or other input is required from the reporting organization to produce any IR report 103 as defined herein.

Events manager 101 further provides a conflict detection and reporting capability that automatically detects and notifies users of date/time scheduling conflicts among events 150 for reporting organizations contained in a particular user's watchlist 160. In a preferred embodiment, whenever a new event 150 is attempted to be scheduled for an organization contained in watchlist 160, events manager 101 compares the date and time scheduling information for the new event 150 to the date and time information for each and every scheduled event 150 for each and every other organization contained in watchlist 160. Alternatively, a user can request events manager 101 to check for possible conflicts for a proposed new scheduled event 150. In either case, if the date/time for one or more existing scheduled events 150 for other organizations contained in watchlist 160 conflicts with the proposed date/time for the new event 150, events manager 101 transmits an IR report 103 to the personal computing device 105 of the user proposing the new event 150 describing the conflict. If the conflict check was explicitly requested by the user, and events manager 101 does not determine a conflict to exist, then events manager 101 transmits an IR report 103 to the personal computing device 105 of the user proposing the new event 150 indicating no conflicts.

Figure 11:
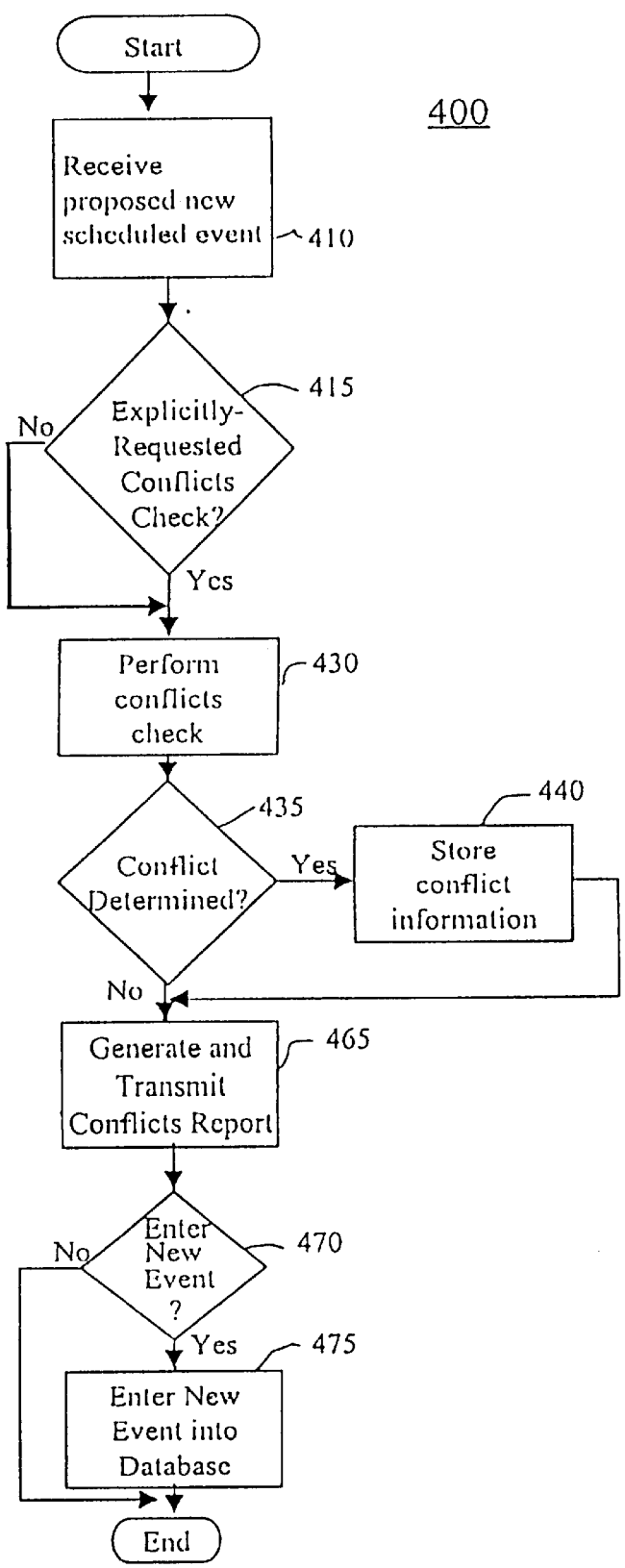
FIG. 11 is a detailed description of a conflict detection and reporting method according to the present invention.

In either case, events manager 101 prompts the user to indicate to events manager 101 whether or not to enter the proposed new event 150 into investor events database 104. If the user sends an indication to events manager 101 to schedule the new event 150, then events manager 101 schedules the new event 150 and new event notifications are transmitted as described herein. The conflicts determination process is described in further detail as follows and as shown in FIG. 11.

In a preferred embodiment, events manager 101 initiates conflicts determination processing 400 in response to receiving a user proposal to schedule a new event 150 during an Internet session with that user (block 410). The user proposal is transmitted from personal computing device 105 and received by events manager 101 via interactive web page in accordance with the HTTP messaging protocol. If a user session is not already established, the user may first establish a session as described elsewhere herein.

Events manager 101 next determines if the user proposal contains an indication that the user has explicitly requested a conflicts check (block 415). In a preferred embodiment, this is accomplished by checking the contents of a predefined interactive field of the ASP-formatted interactive web page received from personal computing device 105. If a conflicts check is explicitly requested, then events manager 101 proceeds to block 430; otherwise, if the user proposal does not contain an indication that the user has explicitly requested a conflicts check as determined in block 415, then events manager 101 also proceeds to block 430.

Upon receipt of a requested conflicts check from block 415 or a determination of a new event 150 being scheduled for an organization contained on watchlist 160 from block 410, events manager 101 performs conflicts check processing as follows (block 430). In a preferred embodiment, events manager 101 requests scripting engine 102 to execute one or more scripts 125 to retrieve and compare each event 150 record for each organization contained in the submitting user's watchlist 160. The associated script or scripts 125 specify one or more database query procedure calls, preferably in the form of SQL instructions, to DBMS 170 that cause DBMS 170 to retrieve the records for these events 150 and compare the date/time information fields of each event 150 record to the date/time information specified in the user proposal to determine if the new event 150 conflicts in time with one or more existing scheduled events 150.

Figure 12:
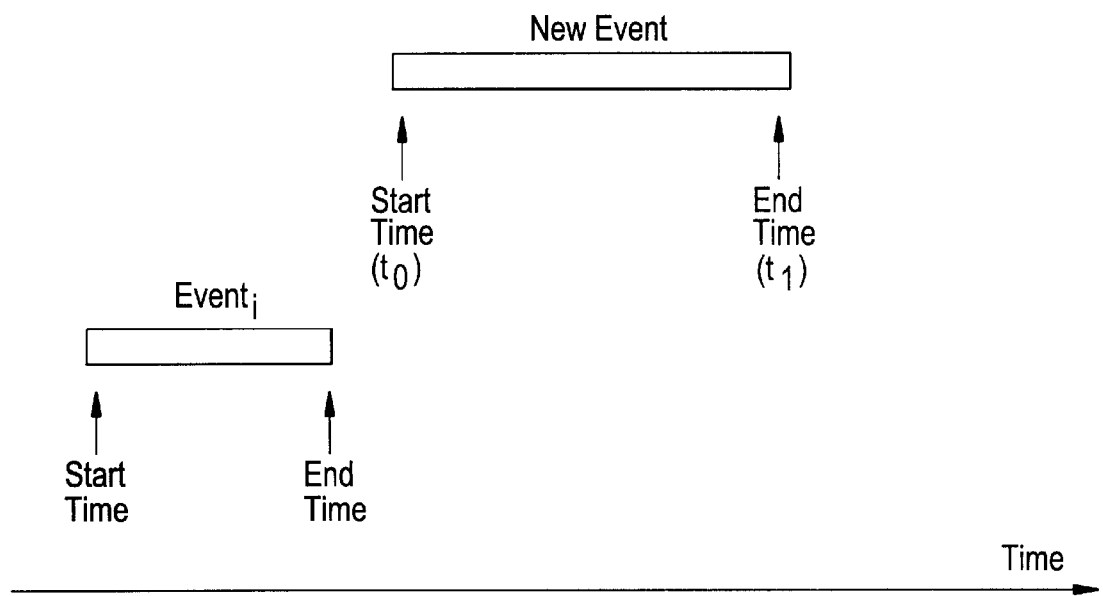
FIG. 12 is a description of a non-conflict condition between a new event and an existing event.
Figure 13:
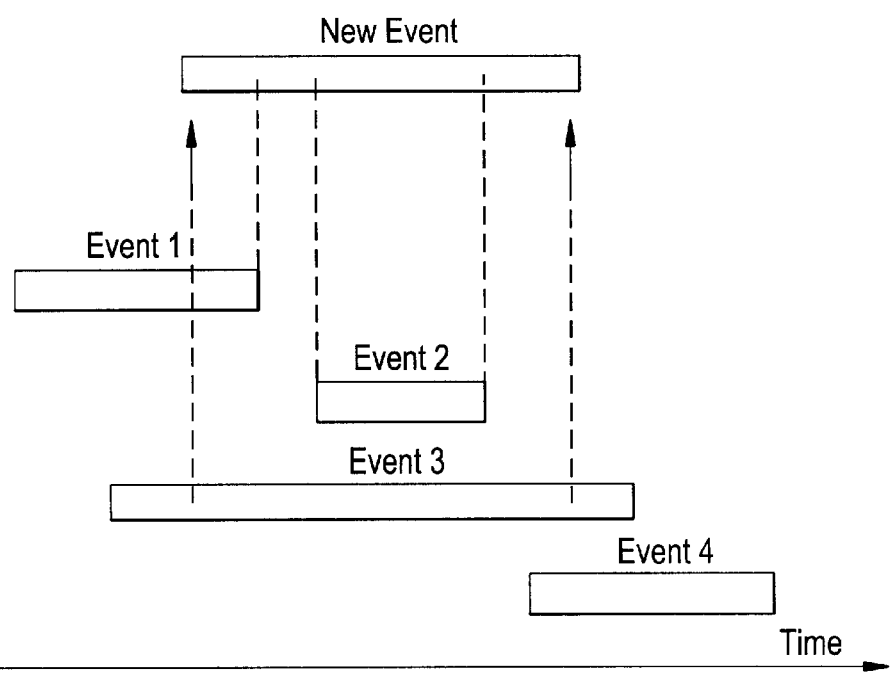
FIG. 13 is a description of four possible conflict conditions between a new event and an existing event.
Figure 14:
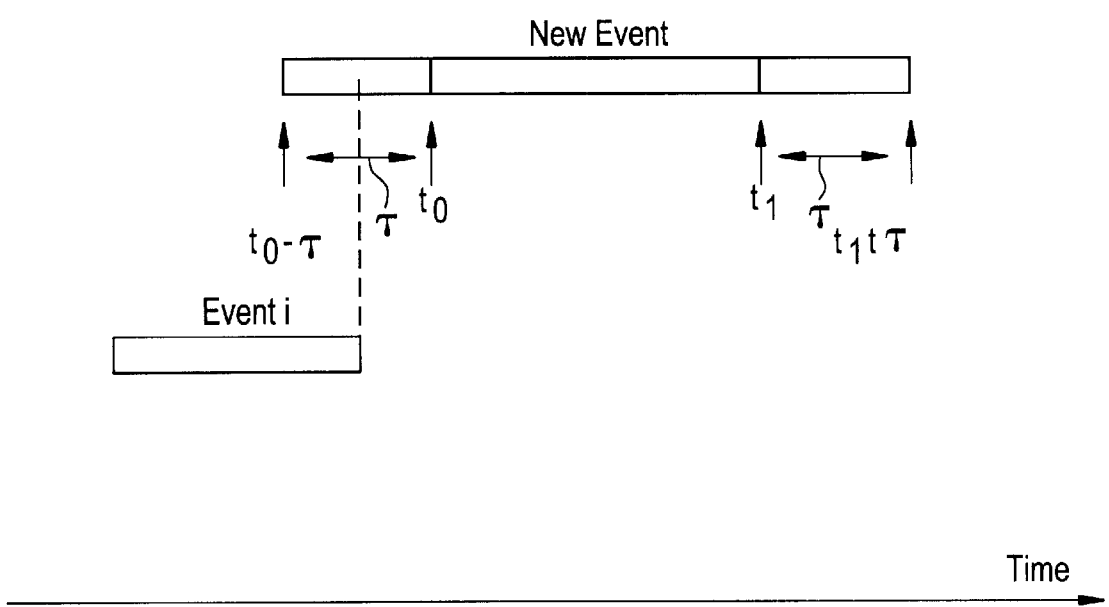
FIG. 14 is a description of a possible conflict condition between a new event and an existing event for an alternative embodiment of the present invention that includes a time buffer.

This process is shown in more detail in FIGS. 13 and 14. More specifically, in a preferred embodiment, events manager 101 determines a conflict condition if any point during the time duration for the new event 150 coincides with any point in time during the time duration of an existing event 150 (block 435). Existing events may be denoted as $Event_i$. FIG. 12 shows a non-conflict condition. FIG. 13 shows four possible conflict conditions between a new event 150 and an existing event 150, $Event_i$.

In an alternative embodiment, events manager 101 determines a conflict condition if any point during the time duration for the new event 150 expanded by a buffer time, $\tau$, coincides with any point in time during the duration of an existing event 150, $Event_i$. This alternative embodiment is shown in FIG. 14. Referring now to FIG. 14, let $t_0$ be the start time for new event 150, $t_1$ be its end time, and $\tau$ be the buffer time. The duration for new event 150 is increased by an amount $2\tau$, for conflicts check processing purposes, by modifying the start time $t_0$ to begin earlier in time by an amount $\tau$ and by modifying the end time $t_1$ to end later in time by an amount $\tau$. The buffer time, $\tau$, is specified by the user by entering the desired buffer time, in units of minutes, into a predefined interactive field of the ASP-formatted interactive web page received from personal computing device 105. In this alternative embodiment, the duration of new event 150 for conflict checking purposes begins at modified start time $t_0-\tau$ and ends at modified end time $t_1+\tau$. This alternative embodiment is thus useful for events manager 101 to account for an operator-selectable desired buffer time between scheduled events 150 of interest to the user.

Referring again to FIG. 11, if events manager 101 determines a conflict condition in block 430 (block 435), then events manager 101 stores relevant information associated with the existing event 150, $Event_i$, for generation of a IR report 103 indicating a conflict condition (block 440). Relevant event 150 information obtained from investor events database 104 and stored includes, but is not limited to, a description of the conflicting existing event 150, its start and end times, its associated organization, and a description of the new event 150, its start and end times, and its associated organization.

Upon performing conflicts check processing and storing any conflict information, events manager 101 generates an IR report 103 as described herein indicating the conflict condition(s) thus determined, using the stored conflicts information from block 440 (block 465). To generate the IR report 103 indicating a conflict condition, events manager 101 requests scripting engine. 102 to execute one or more ASP scripts 125 to generate the requested interactive web page from the information contained in investor events database 104 as described elsewhere herein. The web page thus generated is then transmitted by events manager 101 to the personal computing device 105 of the user proposing the new event 150 in accordance with the HTTP messaging protocol. Personal computing device 105 then displays IR report 103 to the user via web browser.

Upon receiving the IR report 103, the proposing user may choose to request events manager 101 to enter the proposed scheduled event 150 despite any indicated conflicts (block 470). The proposing user may accomplish this by transmitting an electronic message, in accordance with the HTTP messaging protocol, from the personal computing device 105 of the user to events manager 101 a request to enter the new scheduled event 150. Upon receipt of this request, events manager 101 enters the new scheduled event 150 into investor events database 104 as described elsewhere herein (block 475). If the user does not wish to enter the proposed new scheduled event 150, the proposing user may choose to modify the start and/or stop times for the new scheduled event 150 in order to avoid one or more conflicts, and then reinitiate conflict check processing for the modified proposed new scheduled event 150 (block 470).

In this way, a user of.event scheduling system 100 according to the present invention is automatically notified of scheduling conflicts for otganizations on watchlist 160 that would result if the proposed new event 150 were to be scheduled. This allows a proposing user to use the conflicts feedback received via IR report 103 to determine a preferred schedule for the new event 150. For example, a user can choose to modify the start and/or stop times for the proposed new event 150 to minimize or avoid date/time conflicts among other organizations' events 150 of interest to the same analyst or group of analysts.

In an alternative embodiment, events manager 101 further provides.an event guard reporting capability in addition to the conflict detection and reporting capability described herein. In this alternative embodiment, events manager 101 automatically detects a conflict condition (as described earlier herein) in which a new scheduled event 150 has been entered that conflicts in date/time with one or more existing events 150. Upon detecting one or more such conflict conditions, event manager 101 transmits one or more IR reports 103 to the personal computing devices 105 of users associated with the existing scheduled events 150 for which a conflict condition has been determined, in order to notify the users of the date/time scheduling conflicts caused by the newly entered event 150. Events manager 101 may determine the set of users to be notified in a variety of ways including, but not limited to: By requesting scripting engine 102 to execute one or more scripts 125 to retrieve and identify, using watchlists 160, the users associated with organizations associated with each existing event 150 for which a conflict condition has been determined; by including in each watchlist 160 record a further optional information field in which a user may specify one or more organizations for which events manager 101 should report conflicting new scheduled events 150; or by events manager 101 maintaining one or more lists of organizations for whom a particular set of users will be notified of conflicting events (e.g., all Fortune 100 company events).

Thus, an automated event scheduling system and method has been shown that provides reliable and timely dissemination of investor relations information and events, including automatic notification of conflicts in the scheduling of investor relations events, and that provides automatic notification of scheduled investor relations events.

While the above description contains much specific detailed information, these details should not be construed as limitations on the scope of the invention, but rather as an exemplification of one preferred embodiment thereof. Other variations are possible. Accordingly, the scope of the present invention should be determined not by the embodiments illustrated above, but by the appended claims and their legal equivalents.

What is claimed is:

1. An automated events scheduling system comprising:
  a database for storing events information and at least one watchlist that associates a particular user with at least one organization;
  an events manager capable of electronically receiving new event information submitted by a user, producing a plurality of reports using event information contained in said database and said watchlist, and automatically electronically transmitting said reports to a plurality of event addressees comprising users associated with said organization associated with said new event as determined by said database;
  said events manager further comprising access means operably coupled to said database for accessing contents of said database; and
  at least one personal computing device associated with a user and operably coupled to said events manager via an electronic network for transmitting and receiving electronic messages including said new event information and said reports.

2. The system of claim 1 wherein said events manager collects events information from users associated with multiple organizations, said collected information being stored in said database.

3. The system of claims 1 or 2 wherein said events manager produces and transmits said reports in response to a user request received via one of said personal computing devices.

4. The system of claims 1 or 2 wherein said events manager determines the existence of a conflict between a proposed new scheduled event and event information stored in said database and automatically electronically transmits a conflict report to the personal computing device associated with the user who submitted the new event information.

5. The system of claim 4 wherein said conflict report comprises user requested reports and new event reports, and wherein said events manager automatically transmits said new events reports to a plurality of event addressees comprising users associated with said organization associated with said new event and determined by said database.

6. The system of claims 1 or 2 wherein said events manager determines the existence of a conflict between a proposed new scheduled event and event information stored in said database and automatically electronically transmits a conflict report to the personal computing devices associated with the users associated with event information stored in said database.

7. An automated events scheduling system comprising:
  a database for storing events information and a plurality of watchlists that associate a users with at least one organization;
  an events manager capable of receiving new event scheduling information or requests for reports submitted by one of a plurality of users, producing a plurality of reports using event information contained in said database and said watchlists, and electronically transmitting said reports to selected users;
  said events manager further comprising a scripting engine for providing access to said database, said scripting engine operably coupled to said database for accessing contents of said database in accordance with instructions specified in a plurality of scripts;
  a plurality of personal computing devices, each said device being associated with one of said users, and operably coupled to said events manager via an electronic network for transmitting and receiving electronic messages including said new event information and said reports;
  said events manager automatically transmitting said new event reports to a plurality of event addressees comprising users associated with said organization associated with said new event as determined by said database; and
  said events manager producing and transmitting said user requested reports to said personal computing devices using an electronic network in response to a user request received via said personal computing device.

8. The system of claim 7 wherein said events manager further comprises a conflict detector for determining the existence of conflicting date/times between a proposed new scheduled event and each previously scheduled event stored in said database associated with each organization specified on said watchlist for a particular user, said conflict detector automatically transmitting a report providing the conflicting information to said personal computing device associated with the user who submitted the new event scheduling information.

9. The system of claim 7 wherein said new event reports include an electronic mail message further including a file provided in accordance with the vCalendar specification.

10. The system of claim 8 wherein the time duration for said proposed new scheduled event is expanded by a buffer time immediately preceding the start time and immediately following the stop time for said proposed new scheduled event, such that a conflict condition is established if any point in the time duration of one or more said previously scheduled events overlaps expanded time duration of said proposed new scheduled event.

11. The system of claim 7 wherein said scripts are provided in accordance with Structured Query Language (SQL).

12. An automated events scheduling system comprising:
  an events manager;
  a plurality of personal computing devices operably coupled to said events manager for transmitting and receiving electronic messages to and from users of the system using an electronic network;
  a database for storing events information and a plurality of watchlists that associate users with at least one organization;
  a database server;
  said events manager further comprising means for accessing said database;
  said events manager being capable of receiving new event scheduling information or requests for reports submitted by one of a plurality of users, producing a plurality of reports using event information contained in said database and said watchlists, and electronically transmitting said reports to selected users;
  said reports further comprising user requested reports and new event reports;
  said events manager automatically transmitting said new event reports to a plurality of event addressees comprising users associated with said organization associated with said new event as determined by said database;

said events manager producing and transmitting said user requested reports to said personal computing devices using an electronic network in response to a user request received via said personal computing device;

said new event reports further comprising an electronic mail message including a new event file specially adapted for data exchange with calendaring applications; and said events manager further comprising conflict detection means for determining the existence of conflicting date/times between a proposed new scheduled event and each previously scheduled event contained in said database associated with each organization specified on said watchlist for a particular user, said conflict resolution means automatically transmitting a report providing the conflicting information to said personal computing device associated with the particular user associated with said watchlist.

13. The system of claim 12 wherein said new event file is provided in accordance with the vCalendar specification.

14. The system of claims 1, 7, or 12 wherein said personal computing device is a personal computer (PC).

15. The system of claims 1, 7, or 12 wherein said personal computing device is a personal digital assistant (PDA).

16. The system of claims 1, 7, or 12 wherein said events information includes archived audio files suitable for streaming transmission to users via an electronic network, and said archived audio files providing the capability for a user to listen to audio conferences previously recorded and stored in said database.

17. A method of detecting and reporting conflicts between a proposed new scheduled event and one or more existing scheduled events comprising the steps of:

storing events scheduling information in a database;

associating, in said database, each stored event with an organization, and each organization with one or more users;

receiving a proposed new scheduled event from a proposing user via electronic message over an electronic network;

determining conflicts between said proposed new scheduled event and one or more stored events;

generating a conflict report describing the conflict condition; and transmitting said conflict report to said proposing user via electronic message using an electronic network.

18. A method of detecting and reporting conflicts, between a proposed new scheduled event and one or more existing scheduled events comprising the steps of:

collecting event scheduling information from a plurality of users;

storing said events scheduling information in a database;

associating, in said database, each stored event with an organization, and each organization with one or more users;

receiving a proposed new scheduled event from a proposing user via electronic message over an electronic network;

determining conflicts between the new scheduled event and one or more stored events by comparing the date/time of the new scheduled event to the date/time for each stored event associated with the same organization as the new scheduled event and stored in said database, and determining whether any point in time during the duration of the new scheduled event coincides with any point in time during the duration of the stored event;

generating a conflict report describing the conflict condition; and transmitting said conflict report to said proposing user via electronic message using an electronic network.

19. The method of claim 18 further comprising receiving from said proposing user a request via electronic message using an electronic network to enter said new scheduled event into said database;

determining a list of event addressees comprising users associated with said organization associated with said new event as determined by said database;

transmitting an interactive report describing said new scheduled event via electronic message to said event addressees; and transmitting an electronic mail message to said event addressees.

20. The method of claim 19 further comprising transmitting a calendaring data file specially adapted to conform to interface standards for electronic exchange of calendaring information as an attachment to said SMTP-formatted electronic mail message.

21. A method of detecting and reporting conflicts between a proposed new scheduled event and one or more existing scheduled events comprising the steps of:

storing events scheduling information in a database;

associating each stored event with an organization;

associating each organization with one or more users;

receiving a proposed new scheduled event from a proposing user via HTTP-formatted electronic message over the Internet;

determining conflicts between the new scheduled event and one or more stored events by comparing the date/time of the new scheduled event to the date/time for each stored event associated with the same organization as the new scheduled event and stored in said database, and determining whether any point in time during the duration of the new scheduled event coincides with any point in time during the duration of the stored event;

generating a conflict report describing the conflict condition;.

transmitting said conflict report to said proposing user via HTTP-formatted electronic message using the Internet;

optionally, receiving from said proposing user a request via electronic message formatted in accordance with Hypertext Transport Protocol (HTTP) using the Internet to enter said new scheduled event into said database;

determining a list of event addressees comprising users associated with said organization associated with said new event as determined by said database;

transmitting an interactive report describing said new scheduled event via HTTP-formatted electronic message using the Internet to said event addressees.

22. The method according to claim 21 wherein said step of transmitting an interactive report further comprises:

transmitting an electronic mail message formatted in accordance with Simple Mail Transport Protocol (SMTP) to said event addressees using the Internet; and transmitting a calendaring data file specially adapted to conform to interface standards for electronic exchange of calendaring information as an attachment to said SMTP-formatted electronic mail message using the Internet.

23. The method according to claim 21 wherein said step of transmitting a calendaring data file further comprises formatting said calendaring data file to conform with the vCalendar file format.

24. The method according to claims 19 or 21 further comprising transmitting an interactive report describing said new scheduled event via HTTP-formatted electronic message using the Internet to each user associated with one or more said stored events for which a conflict condition is determined.

25. A method of collecting and disseminating notifications of events using an electronic network comprising the steps of:

receiving scheduling information for a new event from a user via an electronic message over an electronic network;

storing said new event scheduling information in a database;

associating, in said database, each said stored event information with an organization, and each organization with one or more of said users;

generating a report describing said stored event; and transmitting said report via an electronic message using an electronic network to a plurality of users associated with said organization associated with said event as determined by said database.

26. The method of claim 25 wherein said step of transmitting further comprises:

determining a list of event addressees comprising users associated with said organization associated with said new event as determined by said database;

transmitting an interactive report describing said new scheduled event via HTTP-formatted electronic message using the Internet to said event addressees;

transmitting an electronic mail message formatted in accordance with Simple Mail Transport Protocol (SMTP) to said event addressees using the Internet; and transmitting a calendaring data file specially adapted to conform to interface standards for electronic exchange of calendaring information as an attachment to said SMTP-formatted electronic mail message using the Internet.

27. The method according to claims 25 or 26 wherein said step of transmitting a calendaring data file further comprises formatting said calendaring data file to conform with the vCalendar file format.

\* \* \* \* \*